No. 615,292. Patented Dec. 6, 1898.
M. MAAS.
ELECTRIC BATTERY.
(Application filed Sept. 7, 1897.)
(No Model.)
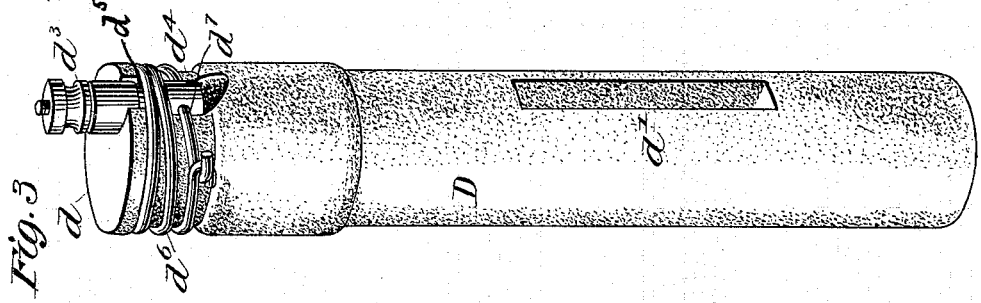
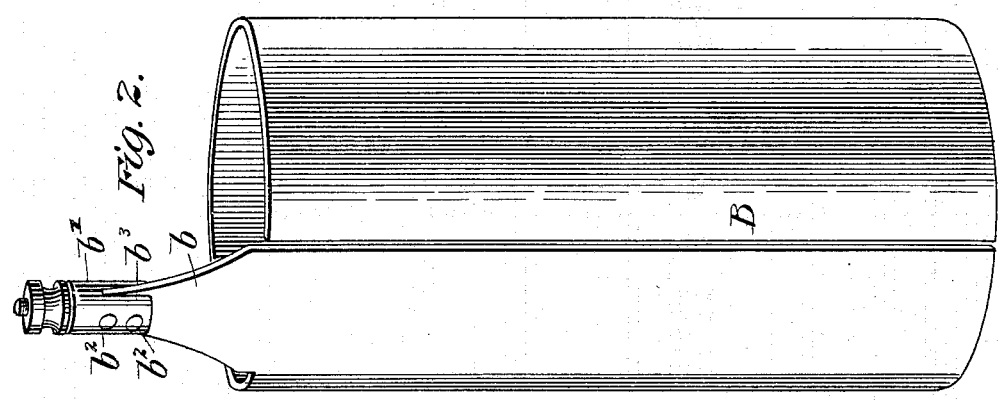
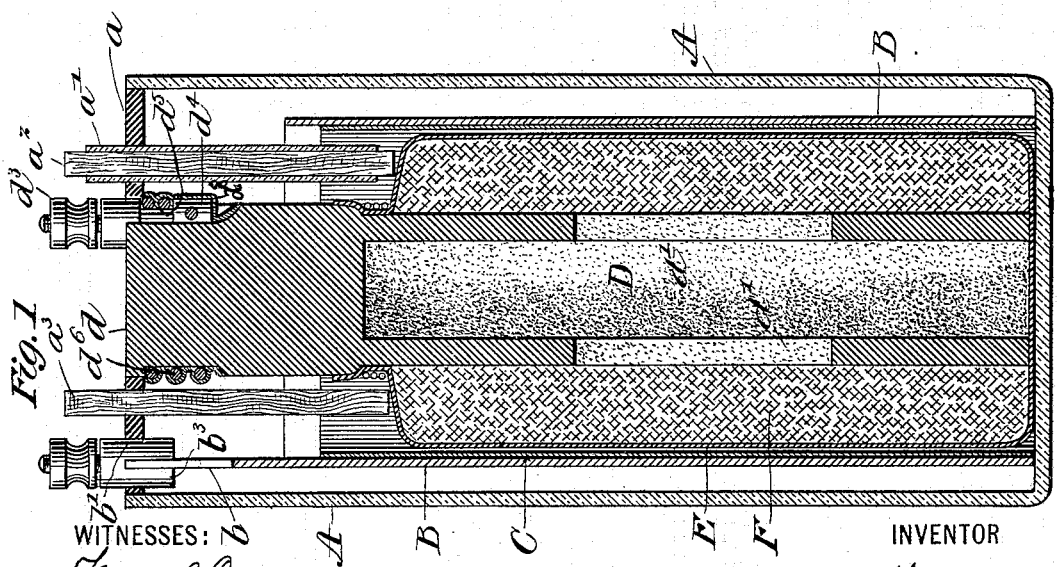
WITNESSES:  
INVENTOR  
Maurice Maas  
BY  
Edwin H. Brown  
his ATTORNEY

UNITED STATES PATENT OFFICE.

MAURICE MAAS, OF NEW YORK, N. Y.

ELECTRIC BATTERY.

SPECIFICATION forming part of Letters Patent No. 615,292, dated December 6, 1898.

Application filed September 7, 1897. Serial No. 650,884. (No model.)

*To all whom it may concern:*

Be it known that I, MAURICE MAAS, of the city, county, and State of New York, have invented a new and useful Improvement in Electric Batteries, of which the following is a specification.

This invention relates to that class of electric generators commonly known as "galvanic batteries," and particularly to the form usually designated "dry" batteries or those in which the liquid employed is held in absorption by a fibrous or pulpy substance interposed between the battery elements.

It is the object of this invention to produce certain improvements in the construction and arrangement of a dry battery, whereby the efficiency and economy of the battery may be increased and its period of automatic action prolonged. These ends are attained in my improved battery by the use of certain novel forms of the zinc and carbon elements and their binding-posts, the method of securing them together, and the specific arrangements of said elements and the means for containing the absorbent material used in this class of batteries.

The jar and binding-posts hereinafter referred to are of common form, except as to the prolongations or shanks of the latter, which are fully described.

My invention is illustrated in the accompanying drawings, in which—

Figure 1 is a sectional view of one cell of my improved battery; Fig. 2, a perspective of the zinc, and Fig. 3 a perspective of the carbon element.

Similar letters refer to like parts in the drawings.

The zinc B is composed of one piece of metal, bent into the circular form shown, and is provided with a projection $b$, integral therewith, for attaching the binding-post $b'$ thereto by means of the escutcheon-pins $b^2$ $b^2$, passing through the zinc and the double or divided shank $b^3$ of the binding-post. It will be seen that this form of zinc eliminates two objectionable features usually found in electric batteries—first, the use of solder for securing together the zinc and binding-post, and, second, the employment of an additional metal piece interposed between the zinc and its binding-post for a like purpose.

A lining C or filling, preferably composed of asbestos, is placed inside the zinc B and surrounds the sack E. This sack is formed from porous material, such as unbleached muslin or asbestos paper, and is adapted to contain the absorbent F, which is generally employed in batteries of this class.

Any absorbent—such as sawdust, plaster-of-paris, or asbestos paper—and liquid, such as sal-ammoniac, may be employed in my improved form of battery.

The carbon D is preferably of tubular shape, open at its lower end, having a rim $d$ at its upper end, and provided with one or more lateral openings $d'$ for the purpose of affording free passage of the liquid to and from the interior of the carbon tube. This construction of the carbon in tubular form presents a much larger area of carbon surface to battery action than could be otherwise obtained. A vertical shallow depression $d^2$ is cut in the upper part of one side of the carbon to receive the shank of the carbon binding-post $d^3$. This binding-post $d^3$ is provided with a prolongation or shank $d^4$, in the surface of which one or more grooves $d^5$ are cut. A binding-wire $d^6$ is wound around the carbon and passes through the grooves $d^5$ and through a hole $d^7$ in the shank $d^4$, after which its ends are secured in such manner as to bind the parts firmly together. The upper part of the carbon, its binding-post, and binding-wire are then immersed and copper-plated in the usual manner employed in plating metals, the object of this construction and treatment being to insure a more complete electric contact than would otherwise be had.

The battery-jar A, of glass, hard rubber, or any non-conducting dense material, is surmounted by a cover $a$ of any non-conducting material, such as a composition of resin and tar, which forms a hermetic seal for the jar. The zinc and carbon binding-posts pass through this cover. A short glass tube $a'$ also penetrates the cover, into which is inserted a plug $a^2$, of bamboo or other porous material, such as ratan. A second similar bamboo stick $a^3$ is passed through the cover. These sticks, while presenting very slight opportunity for evaporation of the liquid used, serve as a vent for such gases as may be generated by battery action. The life of the battery is thus materially prolonged and its recuperative power enhanced. When it becomes necessary to replenish the liquid, the plug $a^2$ may be withdrawn from its tube $a'$ and the battery recharged through said tube.

When the battery is to be charged with the liquid and set up for use, a sufficient quantity of liquid is put into the jar to fully saturate the absorbent and fill the tube D. By reason of the hollow tube of carbon a greater quantity of liquid can be put into the jar than usual in dry batteries using a solid stick of carbon, and by reason of its not directly attacking the zinc B, but through the absorbent and filling of asbestos, the moisture is retained for a greater length of time than heretofore, thereby increasing or enlarging the endurance and life of the battery.

The various features above enumerated are held to produce a stronger and steadier voltage and a higher amperage than would otherwise be possible, and also to minimize the internal resistance and local action of the battery, these conclusions being the result of extended experiment on my part.

Having thus described my invention, I claim—

1. In an electric battery, the combination of a zinc, a hollow carbon provided with a longitudinal recess, a binding-post provided with a shank fitting said recess and with an opening in that end, a binding-wire passing around the carbon and through said opening in the shank, and a copper plating covering the upper part of the said carbon, binding-post, and binding-wire, substantially as described.

2. In an electric dry battery, the combination of a jar, a cover hermetically sealed thereon, a zinc, a filling within the zinc surrounding a bag containing an absorbent, a hollow carbon having its lower end inclosed by the absorbent and provided with openings in that part, a liquid permeating the filling, bag, absorbent, and the interior of said carbon, one or more vents in said cover and porous stoppers for said vents, substantially as specified.

In testimony whereof I have signed my name to this specification in the presence of two subscribing witnesses.

MAURICE MAAS.

Witnesses:
ANTHONY GREF,
WM. H. CLARKE.